United States Patent [19]
Nagata et al.

[11] Patent Number: 5,696,984
[45] Date of Patent: Dec. 9, 1997

[54] OUTPUT APPARATUS AND METHOD FOR VARYING SIZE OF CACHE MEMORY AREA

[75] Inventors: Satoshi Nagata, Tama; Toru Matoba, Tokyo, both of Japan

[73] Assignee: Canon Kabushiki Kaisha, Tokyo, Japan

[21] Appl. No.: 458,455

[22] Filed: Jun. 2, 1995

Related U.S. Application Data

[63] Continuation-in-part of Ser. No. 128,251, Sep. 28, 1993, abandoned, which is a continuation of Ser. No. 490,425, Mar. 8, 1990, abandoned.

[30] Foreign Application Priority Data

Mar. 8, 1989 [JP] Japan ................................. 1-53612
Mar. 8, 1989 [JP] Japan ................................. 1-53615

[51] Int. Cl.$^6$ ................................. G06F 9/00
[52] U.S. Cl. ................ 395/800; 395/442; 395/110; 395/114; 364/DIG. 1; 364/243; 364/243.4
[58] Field of Search ................ 395/800, 425, 395/400, 110, 164, 403, 445, 442, 833, 150, 151, 162, 163, 114

[56] References Cited

U.S. PATENT DOCUMENTS

| | | | |
|---|---|---|---|
| 4,156,904 | 5/1979 | Minowa et al. | 364/200 |
| 4,412,300 | 10/1983 | Watson et al. | 364/200 |
| 4,686,525 | 8/1987 | Nagata | 340/790 |
| 4,715,006 | 12/1987 | Nagata | 364/523 |
| 4,763,281 | 8/1988 | Arakawa | 395/110 |
| 4,785,391 | 11/1988 | Apley et al. | 340/730 |
| 4,807,186 | 2/1989 | Ohnishi et al. | 364/900 |
| 4,837,712 | 6/1989 | Shibamiya | 400/70 |
| 4,866,671 | 9/1989 | Yokoyama | 395/110 |
| 4,879,666 | 11/1989 | Kembo | 395/110 |
| 4,926,314 | 5/1990 | Dhuey | 395/425 |
| 4,937,565 | 6/1990 | Suwannukul | 340/735 |
| 4,998,210 | 3/1991 | Kadono et al. | 340/790 |
| 5,005,139 | 4/1991 | Tung | 395/101 |
| 5,016,001 | 5/1991 | Minagawa et al. | 340/747 |
| 5,027,313 | 6/1991 | Culley | 364/900 |
| 5,102,244 | 4/1992 | Takeda | 400/121 |
| 5,108,208 | 4/1992 | Gardner | 395/110 |
| 5,125,671 | 6/1992 | Ueda et al. | 273/437 |
| 5,282,269 | 1/1994 | Willems et al. | 395/164 |
| 5,293,477 | 3/1994 | Matoba | 395/151 |

FOREIGN PATENT DOCUMENTS

| | | |
|---|---|---|
| 0121126 | 10/1984 | European Pat. Off. . |
| 0317996 | 11/1988 | European Pat. Off. . |
| 0317996 | 5/1989 | European Pat. Off. . |
| 2588212 | 2/1986 | France . |
| 2627303 | 2/1989 | France . |
| 2196769 | 5/1988 | United Kingdom . |

OTHER PUBLICATIONS

Bortman, Henry, "Here's Looking at Hue", MacUser, Oct. 1988 v4, N10, p. 182 (13).

IBM Technical Disclosure Bulletin, "Method for Providing Subjont Caching in Hidden Refresh Buffer Space", IBM Corp, vol. 29 No. 12 May 1987 p. 5332.

IBM Technical Disclosure Bulletin IBM Corp. vol. 30, No. 4, Sep. 1987 pp. 1795–1796.

*Primary Examiner*—Mehmet B. Geckil
*Attorney, Agent, or Firm*—Fitzpatrick, Cella, Harper & Scinto

[57] ABSTRACT

An output apparatus includes a pattern generator for generating a font pattern such as a character symbol, a memory including a storage area for temporarily storing a dot image corresponding to the generated font pattern and a connector for connecting an external storage to the apparatus. A controller controls the memory to increase a capacity of the storage area when the external storage is connected to the apparatus.

28 Claims, 10 Drawing Sheets

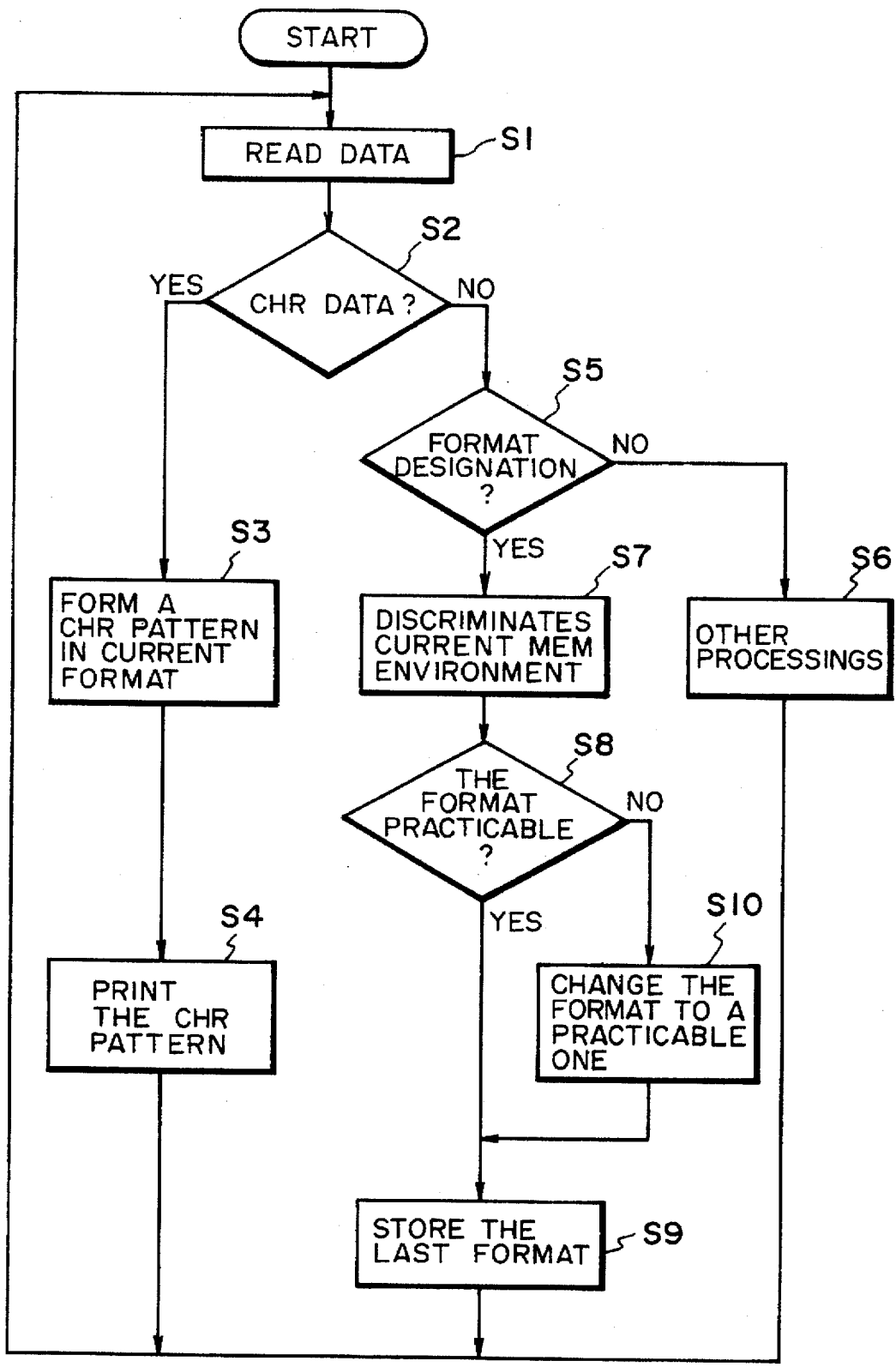
F I G. 9

OUTPUT APPARATUS AND METHOD FOR VARYING SIZE OF CACHE MEMORY AREA

This application is a continuation of application Ser. No. 08/128,251, filed Sep. 28, 1993, now abandoned, which was a continuation of application Ser. No. 07/490,425, filed Mar. 8, 1990, now abandoned.

BACKGROUND OF THE INVENTION

1. Field of the Invention

The present invention relates to an output device for the improvement of dynamic allocation of the font pattern memory area.

2. Related Background Art

Conventionally, among the output devices such as a printer, those which output character symbols in dot pattern (hereinafter called font pattern or character and other pattern), excepting type printer, mostly outputs the character code data provided by the host computer etc. after registering the character and other pattern in the frame buffer memory (one page image memory) by use of a character generator.

The style of character pattern data stored in the character generator may be roughly divided into the following three.

① The font where a character and other pattern (hereinafter simply called character pattern) are composed of a simple dot matrix itself (unprocessed) (hereinafter called "dot matrix").

② The font where a character pattern is memorized by the profile, stroke or by the coordinates relative to the origin of the character (hereinafter called "vector font").

③ The font where a dot matrix pattern is processed by some compression technology (such as Run Length sign method) (hereinafter called "compressed font").

Out of the above, the font which is most frequently used in the conventional output device is "dot matrix font". It is because it memories character pattern itself on the dot matrix and therefore registration in the frame buffer memory can be easily done at a high speed.

However, with the sophistication of performance and increase of resolution of output devices, rotation or deformation of characters have been demanded and thus a "vector font" (outline font) has begun to be used popularly. As the method to cope with the increase of capacity of font resulting from the increase of resolution, a "compressed font" has also come to be used. Recently, the font which mixes these different fonts has also been introduced.

If these styles are grouped under the name of "non-dot matrix", the "non-dot matrix" font has the advantage not possessed by "dot matrix" font but it has the drawback that it requires more time for registration of character pattern in the frame buffer memory when compared to the simple "dot matrix" font.

As the method to solve such problem, a "font cache method" has been made available. In the case of this method, when "non-dot matrix" font is registered in the frame buffer memory, it is first converted into "dot matrix" font and its pattern is memorized and stored and such methods have been used in many output devices to contribute to the improvement of processing speed as a whole. The pattern memory area used for such purpose is called font cache memory and it is usually set aside in the random access memory (RAM) built in the main device.

On the other hand, there are also many devices wherein the entire RAM capacity is easily added by option board etc. which enables to easily expand the device capacity. Such additional RAM board is usually utilized for general purposes.

Therefore, with the conventional model of this type, even when such additional RAM board is connected, the size of font cache memory does not increase because the area set aside for font cache is fixed and the added capacity is not used for the font cache memory and as the result, when the capacity of font cache memory becomes short, the data in the existing cache memory must be erased and the character pattern must be stored anew. Therefore the addition of a RAM board becomes meaningless at least from the viewpoint of font cache memory and it constitutes the cause for the decrease in efficiency of character output in the form of visible image.

Conventionally the output devices have been known wherein font pattern of character symbol etc. (hereinafter simply called character pattern) is formed by the designated format according to the command of the host computer etc. and it is output. For example, like the laser beam printer, the character pattern of designated size and shape is formed in the device and it is printed in dots on a sheet of paper. The format which may be designated is diverse in the form and pattern processing may be made in various styles such as the one where the size of character pattern is as small as several millimeters as shown by 41 of FIG. 10, the one which prints the character pattern in the size freely and stagelessly enlarged up to the full size of the sheet or the one which processes the pattern in various forms before printing, for example, to emphasize its profile as shown in 42 of the said Figure. Unlike the conventional inefficient processing wherein the character pattern must be prepared one by one according to a given format whenever the size and the design of character pattern changes, the aforesaid improved device enables to easily prepare the character pattern of a diverse size and design from one original pattern data. The typical of such original pattern data is for example the font called outline font which expresses the profile of the character by a line composed of coordinates.

However in order to prepare a character pattern of diverse size and design from one original pattern data, it is necessary to do certain processing to prepare such pattern data. For such processing, a large recording area i.e., a large memory is required. To put it another way, the work to prepare such character pattern is restricted by the size of the pattern and method of its processing due to the composition of the memory of the output device to be used and therefore there are certain limits to the character pattern preparing capacity of a device.

On the other hand, with such output devices, it is possible to expand the device itself or to connect various additional devices and thereby expand the capacity of the basic structure. For example, by connecting an additional memory board, the memory environment which the device can use is expanded and so much more character pattern can be prepared.

With such conventional output device, the number of characters which can be formed by the device can be expanded as aforesaid but as for the format of character pattern to be formed, the practiceable pattern forming work is restricted by the basic memory structure of the device itself and therefore the restriction on the pattern formation is programmed from the beginning to accommodate such restriction and therefore even when the memory structure of the device is expanded, the processing capacity can not be expanded beyond the level which is limited by the basic memory structure before expansion.

For example, to form a large character pattern, so much more memory is required. Or, in order to do a complicated pattern processing, so much more memory is also required. Therefore by the composition of the basic memory of the device, the size and the method of processing of a character pattern are restricted. The program to execute formation of a character pattern incorporates such restriction on the size and processing method.

Even when memory is expanded later for example by "additional memory" or "auxiliary memory device", since the program itself exercises restriction based on the basic memory composition, the processing work which can be executed is not at all different from the time before such expansion in spite of the fact that sufficient memory area has been secured therefore.

Conversely, unless such restriction is incorporated in the program, the defficiency of memory for execution of character pattern preparation occurs unexpectedly and in such case correct output is not obtained.

FIG. 11 illustrates the above problem by citing an example. In the Figure, 51 is the formed character pattern and it represents the state wherein printing is being done by changing the size of the pattern freely according to the command for character pattern format given by the host computer.

However as 52 in the Figure indicates, the size of the character pattern which can be formed is restricted by the memory environment at a given time and even when a character pattern larger than that is designated, it can not be obtained.

Besides, 53 in the Figure indicates the print of the similar data given by connecting the additional memory board. By connecting such additional memory board, memory capacity of the device has increased. Because of such increase of the memory, the upper limit of the size of character pattern is raised theoretically but with the conventional device, there is no means to judge the memory increase or the extent of lifting of the upper limit of the character size and therefore character pattern forming is executed in the same manner as before the addition of memory. Thus printing is done under the restriction of the size as shown in 54 even after the addition of memory.

As aforesaid, with the conventional output equipment, forming of character patterns is restricted by the basic memory composition of the device and the problem remains that improvement can not be made even when memory is added.

SUMMARY OF THE INVENTION

In consideration of the foregoing, the object of the present invention is to provide an output device which can dynamically change the area to accommodate the font pattern when necessary.

In consideration of the foregoing, the object of the present invention is to provide the output device which is equipped with pattern generating means which generates a font pattern such as a character symbol, first memory means which stores the generated font pattern and enables to search for it by dot image, second memory means which can memorize the pattern by dot image and a changing means which changes the memory space in such way as to incorporate the second memory means into the first memory means.

In consideration of the aforesaid, the object of this invention is to provide the output device which can discriminate the composition of the memory of the device used and the state of addition of the memory and realize the optimum font pattern formation at a given time by adjusting the restriction on the format in the formation of font pattern such as character symbol in reference to the state of memory at that time.

In consideration of the aforesaid, the object of this invention is to provide an output device to form dot font pattern based on the original pattern data which represent character symbol etc. and output such pattern in dot, the said device being equipped with the means to check the memory environment required for forming or memorizing the dot font pattern, the means to judge the format of the dot font pattern which can be formed according to the state of memory environment checked and the means to change the formation format of the dot font pattern method determined by such judgement.

In consideration of the foregoing, the object of this invention is to provide the output device which can discriminate the composition of the memory and state of addition of memory of the device used, adjust the restriction on the format for forming of the font pattern according to the state of memory at the given time and can realize the optimum character pattern formation achievable at that time.

BRIEF DESCRIPTION OF THE DRAWINGS

FIG. 3A to FIG. 3C are the drawings to illustrate the method of memorizing the character pattern in the example of practise of the present invention.

FIG. 9 is a flow chart to indicate the performance of the printer equipment of the example of practise.

DETAILED DESCRIPTION OF THE PREFERRED EMBODIMENTS

Hereunder is explained an example of a preferred embodiment of the present invention in reference to the attached drawing. This embodiment of the present invention deals with the "non-dot matrix" font which enables the "font cache" area to be added according to a certain rule, in the output device wherein RAM capacity can be increased by the use of an additional board etc.

Figure 2:
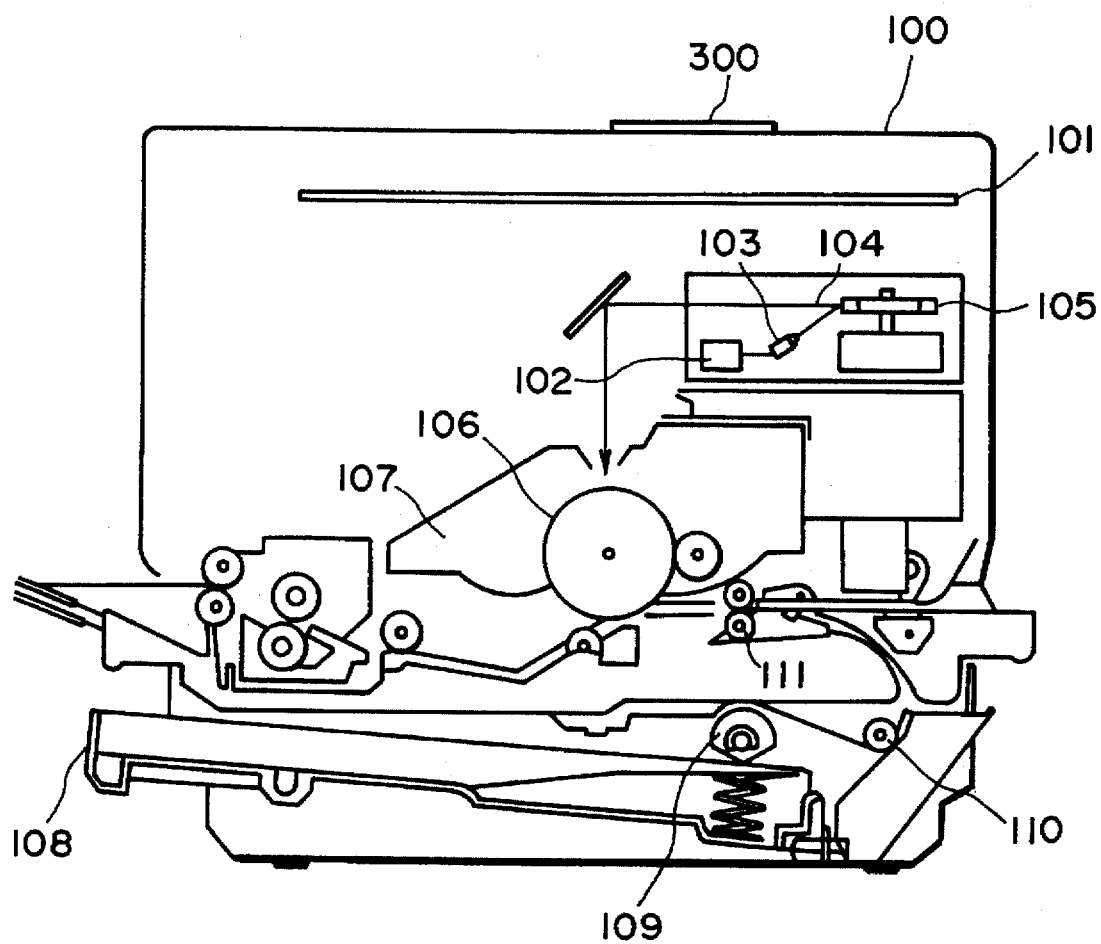
FIG. 2 is a block diagram to indicate an example of composition of printer control unit 101.

First, FIG. 2 is a sectional view to show the internal composition of the laser beam printer of the embodiment of the present invention (hereinafter may be called LBP). The laser beam printer shown in the figure enables to register the character pattern or form pattern by feeding data from the data source (not shown). In the figure, 100 is the main body of LBP which forms an image on the sheet i.e., the recording medium, after converting the character data (character code) etc. fed by the host computer (201) connected at outside into the corresponding character pattern, form pattern etc.; 300 is the operating panel on which the switch for operation, LED indicator etc. are arranged; and 101 is a printer control unit which exercises control of the entire LBP 100 and analyzes the character data etc. supplied by the host computer. Printer control unit 101 converts mainly the character data into the video signals of the corresponding character pattern and outputs it to laser driver 102.

Laser driver 102 is a circuit to exercise drive control of the semiconductor laser 103 and according to the input video signal, it turns ON-OFF the laser beam 104 emitted by semiconductor laser 103. Laser beam 104 is irradiated on the electrostatic drum 106 by being made to swing left and right by the rotary polyhydral mirror 105 and a latent image of character pattern is formed on the electrostatic drum 106. This latent image is developed by the developing unit 107 at around the electrostatic drum 106 and then transcribed on the sheet. A cut sheet is used for the sheet, the cut sheets are accommodated in the sheet cassette 108 mounted on LBP 100, the sheets are drawn into the equipment by feed roller 109 and carrying rollers 110 and 111 and fed to the electrostatic drum 106.

Figure 1:
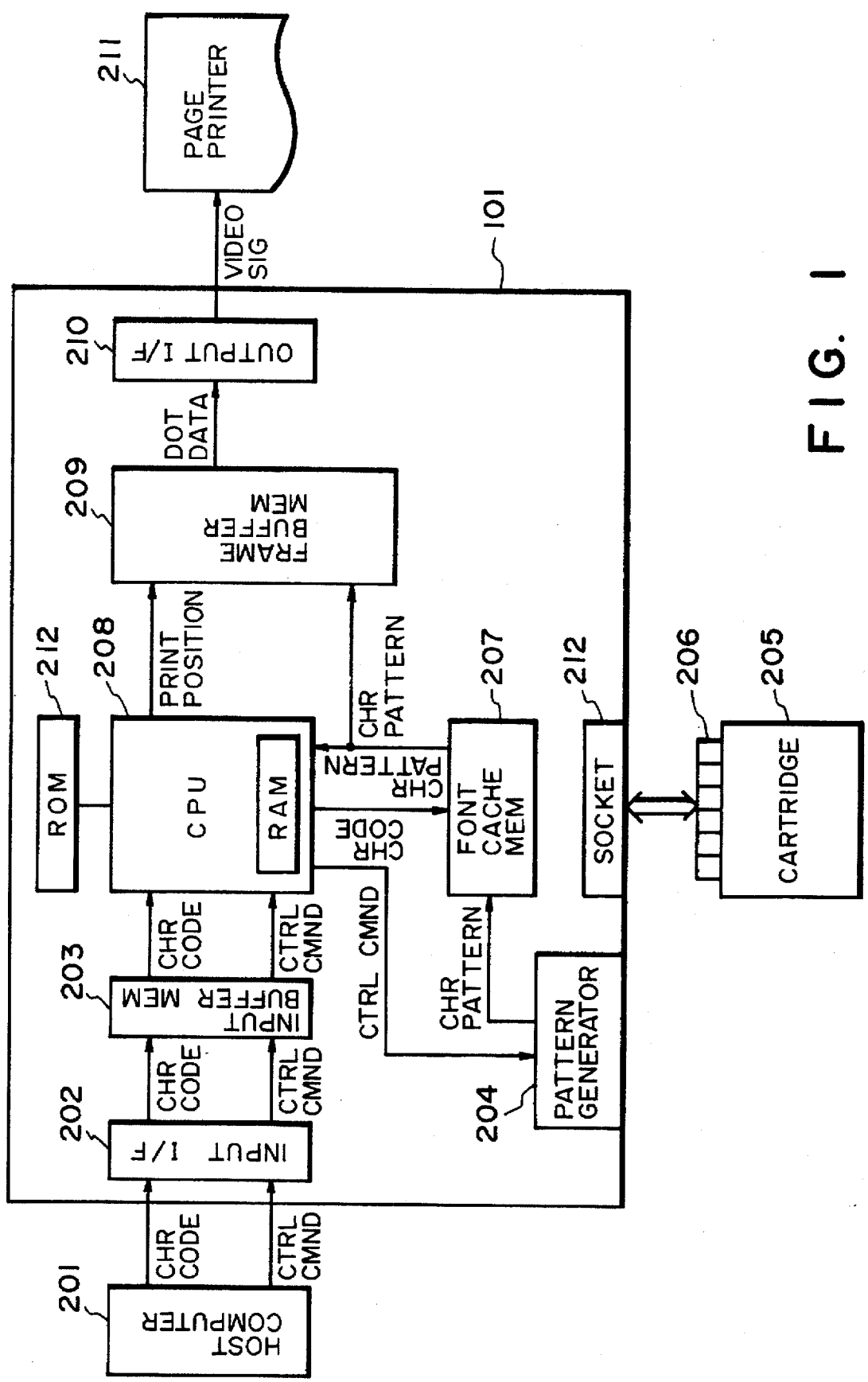
FIG. 1 is a sectional view to indicate the inside of the laser beam printer to which the present invention can be applied.

FIG. 1 indicates an example of composition of the control system of the output device of FIG. 2. The control system with the composition indicated in the Figure shows an example of the case where character code data and a control command delivered from the printing data generating source are input and printing is executed by the printing system to print a document on each page by use of the laser beam printer etc. Here 201 is the host computer working as the printing data generating source which generates character code data and a control command. 202 is an input interface composed of the signal receiving interface circuit for receiving character code data and a control command generated by the host computer 201 and 203 is an input buffer memory composed of the RAM for primary storage of the character code data and control command.

204 is a character pattern generator, which comprises a ROM to store the character pattern condense-codified by Run Length method and control circuit of such ROM, the generator having also the so-called code converter function to calculate the address of each character pattern from the character code data.

205 is a RAM cartridge which comprises a RAM device with 1M byte capacity, its control circuit and the connector 206 for connecting to the main body equipment. This cartridge 205 is connected directly to the bus of CPU 208 of the main body printer by being connected to the main body equipment via the socket 212.

207 is a font cache memory comprising a RAM to memorize and store the pattern obtained by decodifying the condense-codified character pattern into an unprocessed dot matrix pattern. By memorizing the character pattern thus decodified and stored in font cache memory it becomes unnecessary to decodify again the previously used characters and thus high speed printing is realized.

208 is a multipurpose microprocessor to control the entire control part and it houses ROM 212 and controls the entire control system according to the program stored in ROM.

209 is one page frame buffer memory which comprises a RAM for registering the image of the character pattern generated by the character pattern generator and once registered in the font cache memory at a proper position according to the printing position command of the host computer. 201 is an output interface to generate video signals according to the dot pattern data given by the frame buffer memory 209 and to provide the interface with the page printer print 111; 211 is a page printer to receive video signals from output interface 210 and print the image data according to such video signal; and 101 is a CPU board on which this control system is mounted.

Figures 3A, 3B, 3C:
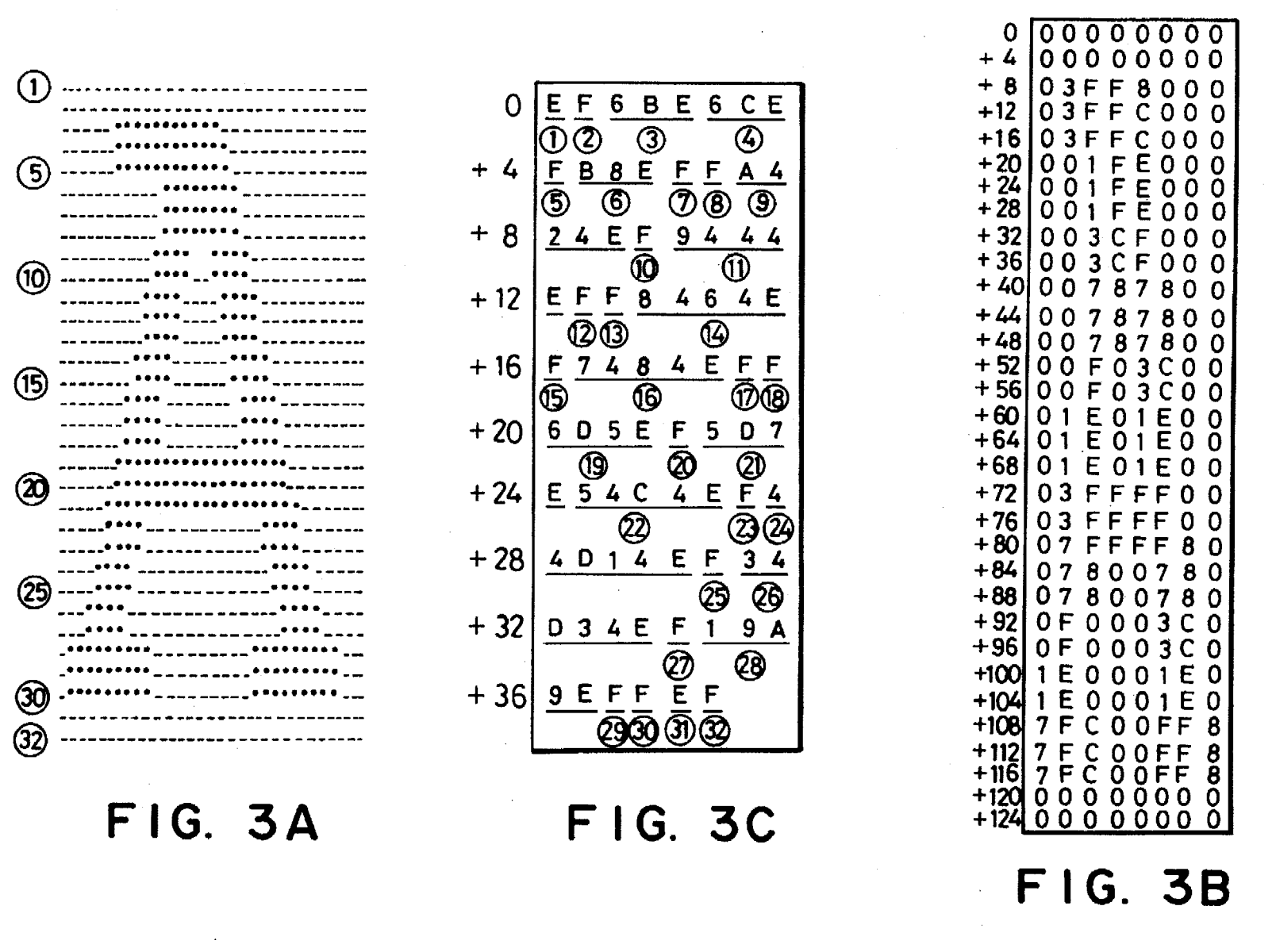

FIGS. 3A to 3C are the drawings to explain the actual method to memorize "dot matrix font" and "non-dot matrix font" of the example of embodiment. FIG. 3A is a sketch to visually indicate the unprocessed "dot matrix font" which indicates that "●" part of the character pattern is formed into an image in black and "●" part is not formed into an image. This character pattern has the composition of 32 dot width and 32 dot height. In the FIG. 1, etc. are line numbers. It is known therefrom that if the characters of FIG. 3A are stored by the format of "dot matrix pattern", memory of 128 byte is required.

FIG. 3B describes the contents of memory in hexadecimal system for the case where the visually expressed character pattern is accommodated in ROM or RAM by the format of unprocessed "dot matrix pattern", wherein the part formed into dark image is represented by the bit "1" "1" while the part not formed into image is represented by bit "0". In this example of the embodiment, the character pattern stored in the font cache memory 207 takes the form of FIG. 3B. FIG. 3C describes the content of memory in hexadecimal system for the case where "non-dot matrix pattern" font format is used and in this example of embodiment, "compressed font" by Run Length method is used. Such Run Length method is composed of the following rules.

ⓐ: Each sign unit is 4 bits
ⓑ: End sign code "E" (hexadecimal) is given to each horizontal direction (scan direction) of one character font pattern
ⓒ: Code "E" means that all the bits of the line pattern following such "E" sign shall be "0"
ⓓ: The scan line having exactly the same content with the scan line immediately preceding thereto is expressed by code "F"
ⓔ: Each sign unit in the scan (4 bit) is expressed by the repetition of "0" (white) and "1" (black) by this order
ⓕ: However when the length is over 13, it is expressed by the sum of code "D" (hexadecimal) and one sign unit following thereto (4 bit). In other words, only this time, length is represented by 8 bits.

For example, in FIG. 3C, "8464" (hexadecimal) which are the contents of 14th scan express that the image is formed by, from left to right, [8 bit of "0", 4 bits of "1", 6 bits of "0", 4 bits of "1" and thereafter by "0"]. Likewise "44D14E" (hexadecimal), the contents of 24th scan, express that the image is formed by, from left to right, [4 bit of "0", 4 bit of "1", 14 (13+1) bit of "0", 4 bit of "1" and thereafter by "0"]. When the above rule is applied, the character pattern expressed by FIG. 3B does not require the memory of more than 39 bytes.

This example of embodiment employs character pattern generator 204 and "non-dot matrix font" using such method.

Figure 4A:
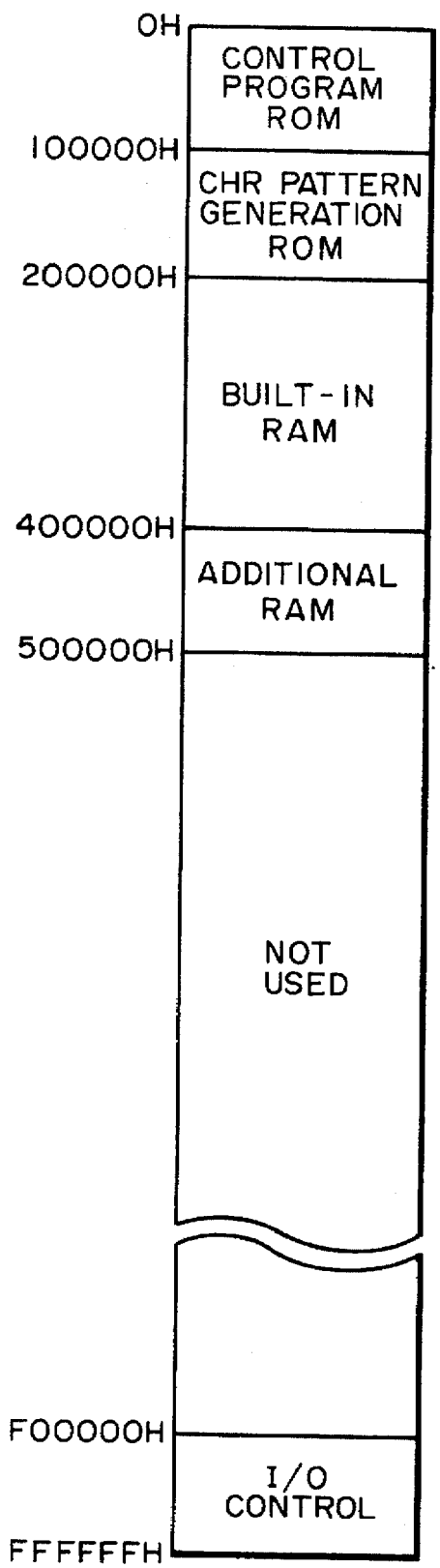
FIG. 4A to FIG. 4C are the memory maps to illustrate the state of use of the memory of the equipment which embodies an example of practise of the present invention.
Figure 4B:
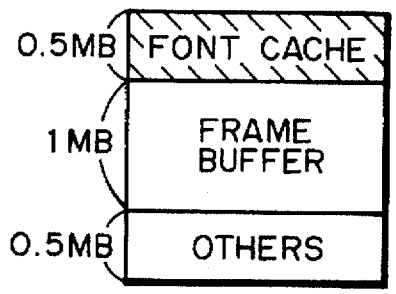
Figure 4C:
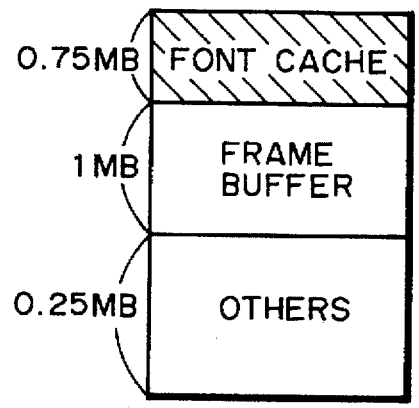

FIGS. 4A to 4C are the memory map to illustrate the state of utilization of the memory.

FIG. 4A is the memory map of the memory space when the entire device is viewed from CPU208 and illustrates the state of allocation of the entire space of 16 MB to each device (memory). The area from the address $0_H$ to the address $FFFFF_H$ is the area to store the control protocol of CPU208 and the area from the address $100000_H$ to the address $1FFFFF_H$ is the space allocated to the ROM built in the character pattern generator 204. To the RAM built in the main body is allocated 2 MB from the address $20000_H$ the address $3FFFFF_H$ and RAM device is also connected. Built-in RAM is the memory in the font cache memory 209 and frame buffer memory 209, in the state where cartridge 205 is not connected in FIG. 1.

To the additional RAM is allocated 1 MB from the address $400000_H$ to $4FFFFF_H$ and the mounting on the additional RAM board 205 also has 1 MB.

FIG. 4B illustrates the allocation of the entire RAM (built-in RAM only) for each purpose of use when additional RAM205 is not connected, the area used as font cache occupying 25% of all area i.e., 0.5 MB.

FIG. 4C illustrates the allocation of the entire RAM for each purpose of use when 1 MB additional RAM board 205 is connected. Out of 1 MB of such board 205, 0.25 MB is allocated for font cache while 0.75 MB is allocated for work. It is known therefrom that the area used as font cache is not more than 25% of the entire area although its capacity has been expanded to 0.75 MB. A switch to be engaged by depression (not shown) is provided at the socket 212 at the main body side and when the cartridge 205 is connected, this switch is depressed and therefore it is possible to judge whether the cartridge has been connected or not.

Figure 5:
FIG. 5 is a drawing to indicate the format of the table to control the font pattern of the device which embodies an example of practise of the present invention.

FIG. 5 is the font table registered as the work area of the built-in RAM by the initialization routine of CPU208. In this font table, each unit is formed for the fixed length for each character code and the stored data comprises the one bit data to indicate whether or not the font pattern is already registered in the font cache memory 209 and the address field in the cache memory 209 in the case when the font pattern is registered.

Figure 6:
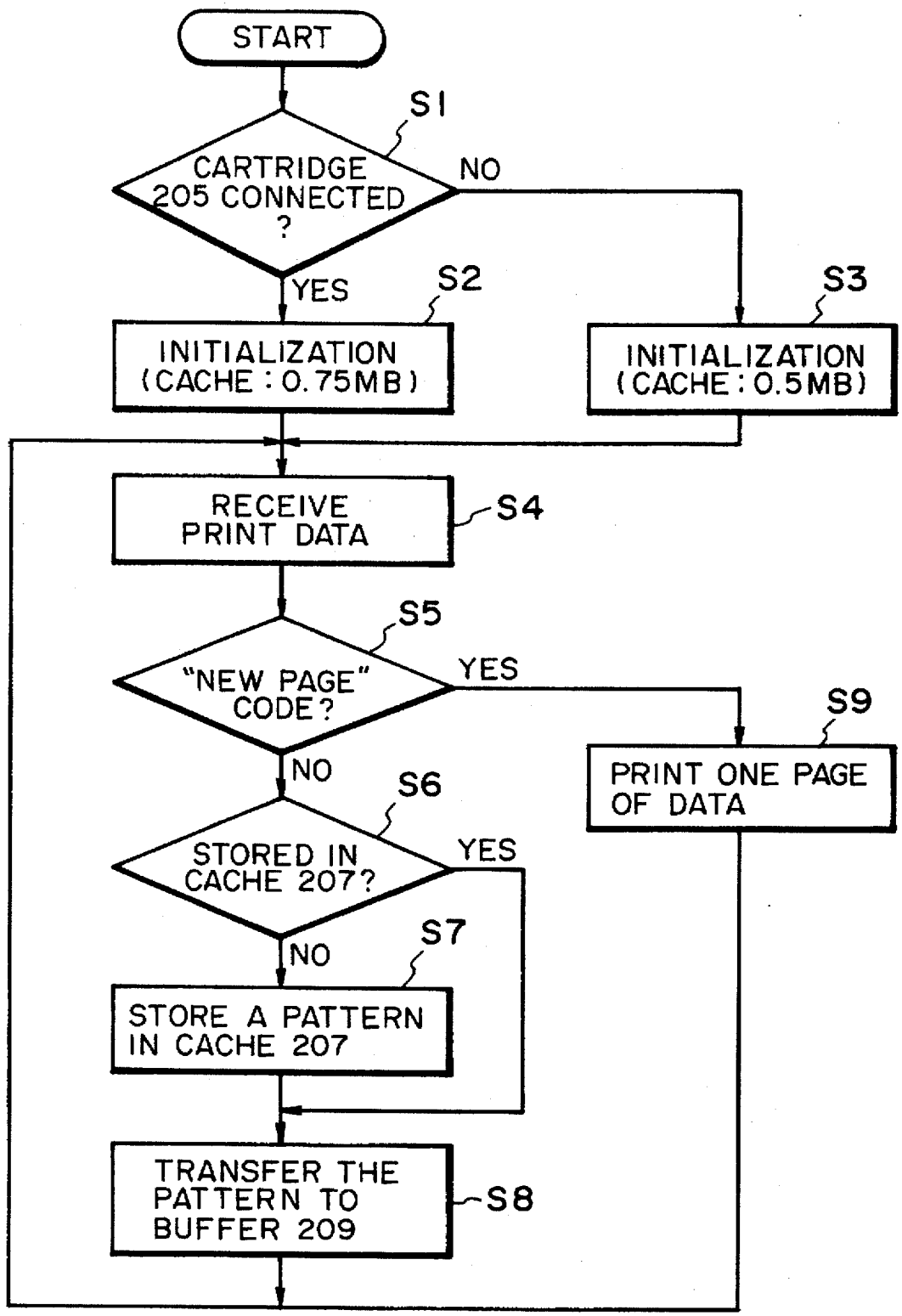
FIG. 6 is a flow chart to indicate the control action of a CPU of the equipment which embodies an example of practise of the present invention.

FIG. 6 is the entire flow chart to indicate the control of CPU208. Hereunder are explained a series of motions in reference to the flow chart of FIG. 6, from the point where printer and CPU board 101 of this example of embodiment are engaged, to the conversion of character code stored in the input buffer memory 202 into character pattern data, transfer of character pattern to the frame buffer memory 209 and up to the printing by page printer 211.

When CPU board 101 is engaged by closing the power source, it judges at Step S1 whether RAM cartridge 205 is connected to the socket 212 after completing the specified initialization process (not shown). If it is connected, it proceeds to Step S2. At Step S2, each area is initialized so that it matches the memory layout of FIG. 4C wherein out of the total RAM capacity of 3M byte, the font cache takes 0.75 MB. In such initialization, the bit which indicates whether the font pattern is registered or not in the cache memory as shown in FIG. 5 becomes "0".

When RAM cartridge 205 is not connected, the mode proceeds to Step S3 wherein each area is initialized in such way that out of the entire RAM capacity 2M byte, the font cache gains 0.5 MB and it matches the memory layout of the aforesaid FIG. 4B. Also in such initialization, the bit to indicate whether or not a font pattern is registered in the cache memory is given "0".

Then the mode proceeds to Step S4 and the printing data delivered from host computer 201 is received from input buffer memory 203 via the input interface. Here, the data to print one character i.e., the character code, designation of printing position, kind of font to be printed etc., are received and then the mode proceeds to Step S5. At Step S5, the character code is examined and whether it is a new page (form feed) code or not is determined. If it is not a new page code, it is a character code to be printed and therefore the mode proceeds to Step S6 and checks whether the character pattern to be printed is already stored in the font cache memory 207 or not. Such checking is executed by the checking bit of FIG. 5.

When the character pattern to be printed is already stored, the mode proceeds to Step S8 and the corresponding character pattern is transferred from font cache memory 207 to frame buffer memory 209 while controlling at which position in the frame buffer memory the image should be formed.

At Step S6, if it is judged that the character pattern to be printed is not stored in the frame buffer the required character pattern is read out of the character pattern generator utilizing the cache memory space left over at the time of font caching in the aforesaid Step S3 and Step S2 and it is registered in font cache memory 207. At this time, the aforesaid test bit is set at "1" and at the same time the starting position in the font cache memory is memorized.

When the idle space of cache memory 209 is fully occupied, the character patterns having been cached in the FIFO system is erased one after another starting from the one cached earliest. Such priority in erasing is not necessarily limited to the said order. The same processing as described in the aforesaid Step S8 is conducted also for the case when the mode proceeds to Step S8 via Step S7.

As aforesaid, after registering 1 character amount of character pattern in the frame buffer memory 209, the mode returns again to Step S4 and the aforesaid processing is repeated. In the meantime, when the code is judged to be a new page code at Step S5, the mode proceeds to Step S9, a video signal is generated via output interface 40, one page video signal is forwarded to the page printer and one page printing is completed by the aforesaid electronic photography process. Then it returns to Step S4 to take the data of the succeeding page and the aforesaid processing is repeated to prepare one page after the other.

As described above, according to the aforesaid example of embodiment, with the output device which deals with "non-dot matrix" font and can be expanded by connecting additional boards etc., it has become possible to expand the "font cache" area according to a preset rule whenever the RAM capacity is added. Thus through the increase of font cache memory corresponding to the optional addition of RAM card, the entire RAM space is effectively utilized and font cache bit ratio is improved. Thus the throughput of the device as a whole improves.

The present invention may be modified in various ways within the scope that does not deviate from the primary concept of the present invention.

In the aforesaid embodiment, the additional RAM is the one which can be connected or disconnected. Therefore a modification as stated below may be proposed. For example, in the built-in RAM of the main body, the frame buffer for plural number of pages and the area for other programs are reserved. Therefore such stand-by area may be utilized as the font cache memory.

In the aforesaid embodiment, a laser beam printer is used as an output equipment but the present invention may be applied to the system other than such a printer, for example, to the image output device such as CRT.

In the example of the embodiment, the font which employs the Run-Length method is used as "non-dot matrix"

font but it may be utilized for a wide range of "non-dot matrix font" such as the outline font which memorizes the so-called profile coordinates, the font which memories the stroke of a character or the font formed by synthesizing the radicals of Chinese characters, etc. In addition, a font cache placed on RAM may easily be replaced for other memory mediums (hard disc etc.).

In the present embodiment, there exists only one character generator and it uses a single "non-dot matrix" font but it may be the one having plural number of character generators.

Further in the present embodiment, the ratio of font cache memory in the total RAM capacity is fixed at 25% but it is very easy to change such ratio by the operation from outside or by the command exercised by the host computer. It is also meaningful to change over such ratio according to the practical need such as to use 25% when RAM card is not connected and 20% when RAM card is connected.

It goes without saying that the shape of RAM card may be board-shaped, cartridge-shaped or IC card-shaped and no designation of specific shape is necessary.

As explained above, according to the present invention, the space of the first memory means in which a font pattern should be memorized can be made to increase or decrease according to the need, by being equipped with the pattern generating means to generate a font pattern such as a character symbol, the first memory means which memorizes the generated font pattern is such manner that it can be retrieved by dot image, the second memory means which is not usually used for memorizing the font pattern but can memorize it by dot pattern and the changing means which dynamically changes the memory space so as to incorporate the second memory means into the first memory means.

According to one aspect of the present invention, the first memory means is built in the main body of the said font pattern forming device and the second memory means comprises the memory means which may be put on-off the said main body and thus the newly added memory is used for memorizing font pattern even when the second memory means is connected from outside.

Other Embodiment of the Invention

Figure 7:
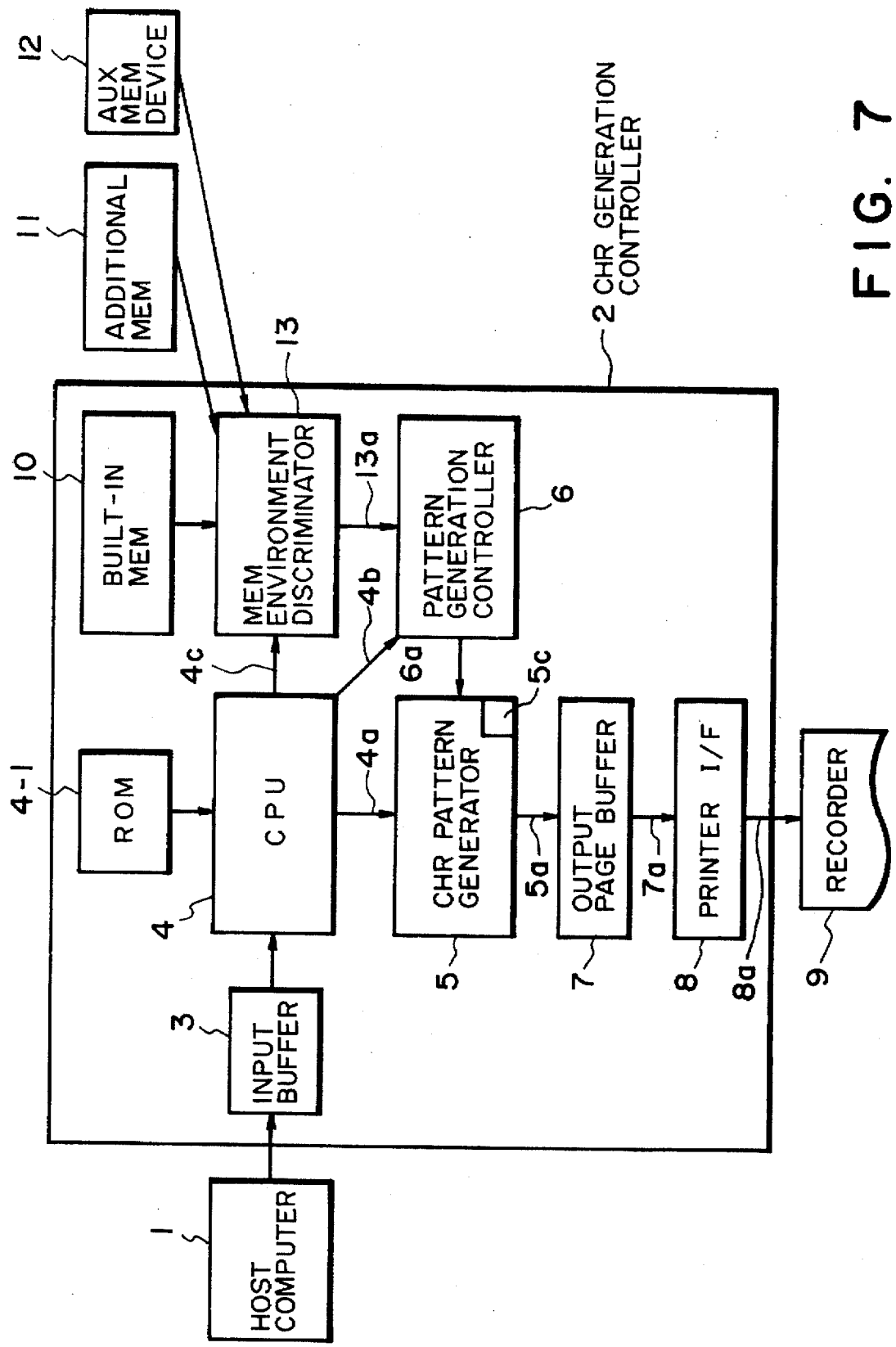
FIG. 7 is a block diagram to show the composition of the page printer which is an example of practise of the present invention.

FIG. 7 is a block diagram to show the composition of the page printer device, which is an example of an embodiment of the present invention.

Here, 1 is the host computer which generates such data as character, number, symbol etc. (hereinafter simply called character data), generates various control commands, a character pattern format designation command which designates the size and design of the character pattern for printing and inputs them into the character generation control section 2 which is the key part of the output device related to the present embodiment.

In the character generation control section 2, 3 is the buffer which temporarily stores the character data, various control data, character pattern format designation command etc. having been input by the host computer 1. 4 is a CPU composed, for example, of a multi-purpose microprocessor, etc. and it executes analysis of the input data stored in the input buffer 3 and the corresponding processing, according to the program a etc. designated by the processing procedures stored in ROM 4-1 to be stated later by reference to FIG. 2.

This CPU4 generates character code 4a when input data are character data. When character pattern format designation command is input, it generates a character pattern formed designation command 4b.

It also generates the memory environment discrimination command 4c for checking the memory environment available for the device at the time when the output device of the present embodiment starts up or when the character pattern format designation command is input.

5 is the character pattern former which generates the dot character pattern 5a based on the original pattern data memorized in 5c according to the character code 4a received from CPU4. 6 is the character pattern formation controller of the present embodiment which instructs the character pattern former 5 the size and the design of the character pattern to be formed according to the character pattern format command 4b received from CPU4, by the character pattern formation control command 6a. Character pattern former 5 forms the character pattern of the size and the design designated by such character pattern formation control command 6a.

7 is an output page buffer which temporarily stores the character pattern 5a received from the character pattern former 5. It delivers the stored dot image 7a to the printer interface 8. Printer interface 8 generates video signal 8a which corresponds to the dot image in the output page buffer 7 and delivers it to the recording section 9 which is, for example, composed of a laser beam printer.

10 is the basic memory built in the main body and character generation controller 2 executes various processing utilizing the memory area of such basic memory. 11 is an additional memory which may be additionally connected to the built-in basic memory and therefore not included in the original composition of the device of character generation controller but is newly connected to the basic memory to enlarge the character generation controller. 12 is an auxiliary memory device such as hardware which is not directly built into the character generation controller but may be used as a part of the memory composition.

13 is the memory environment discriminator of the present embodiment which judges the memory composition of the device at a given time according to memory environment discrimination command 4c. For example it judges what amount of memory is left over for use in the built-in basic memory 10 or how much room is left over in the additional memory 11 or the auxiliary memory device 12 and generates the memory environment data 13a to inform the investigated conditions. Such memory environment data 13a is received by the character pattern formation controller 6. Character pattern formation controller 6 makes calculation from such memory environment data and judges what is the maximum size of character pattern that can be formed, what style of character design can not be formed or which method of pattern forming should be used to perform the most preferred character pattern formation and so forth under the given memory environment, and based on the data obtained therefrom, it delivers character pattern formation control command 6a to the character pattern former 5.

Figure 8:
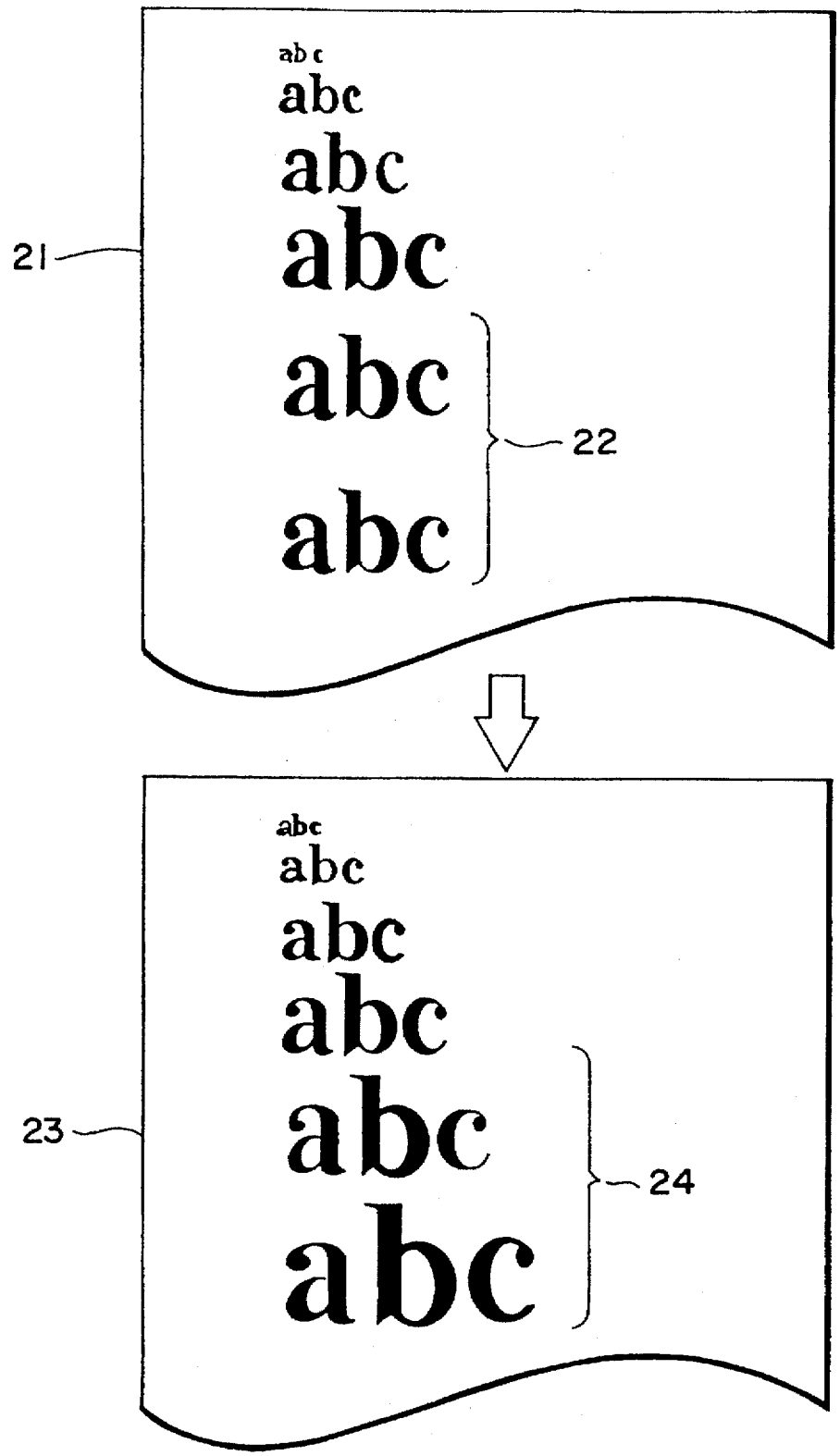
FIG. 8 is a drawing to indicate the improved state of character pattern processing which has been realized by the example of practise.

FIG. 8 shows an example of the mode of formation of character pattern by the device of the present embodiment. In the Figure, 21 is the formed character pattern and the Figure indicates the state of printing made by freely changing the size of the pattern according to the instruction of host computer 1. However as indicated by 22 of the Figure, the size of the character pattern which can be formed is restricted by the memory environment at that time and even when larger character pattern is designated, the size of the character formed does not change.

In the Figure, 23 indicates the print of the similar data obtained by connecting an additional memory board to the device. By connecting an additional memory board, the memory capacity of the device increases. Such increase of memory capacity is judged by the present embodiment and informs such increase of memory to the character pattern formation controller 6 of the present embodiment. The character pattern formation controller 6 judges that the upper limit of the size of character pattern made available has become larger due to the increase of memory. Thus the character pattern of the size which can not be formed before the addition of the memory can now be printed as shown by 24.

Figure 10:
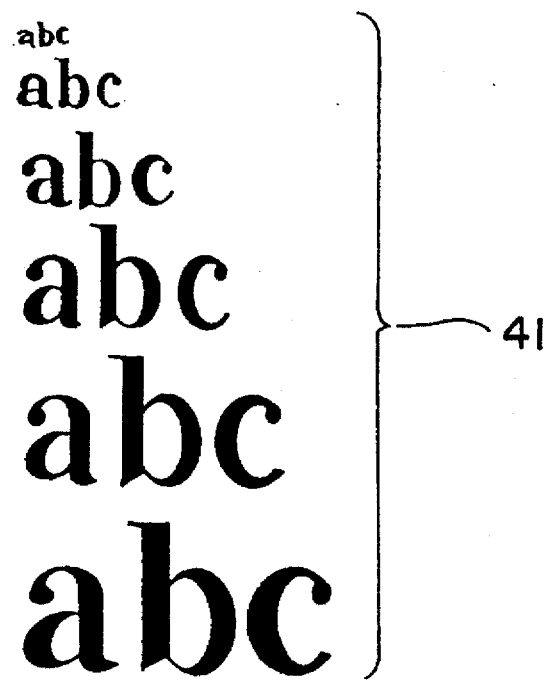
FIG. 10 is a plan view to indicate an example of the character pattern formed by character pattern formation process.
Figure 10:
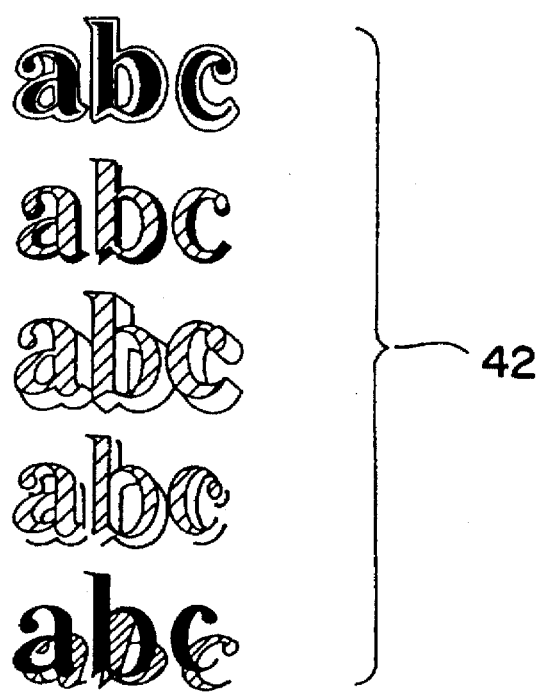
Figure 11:
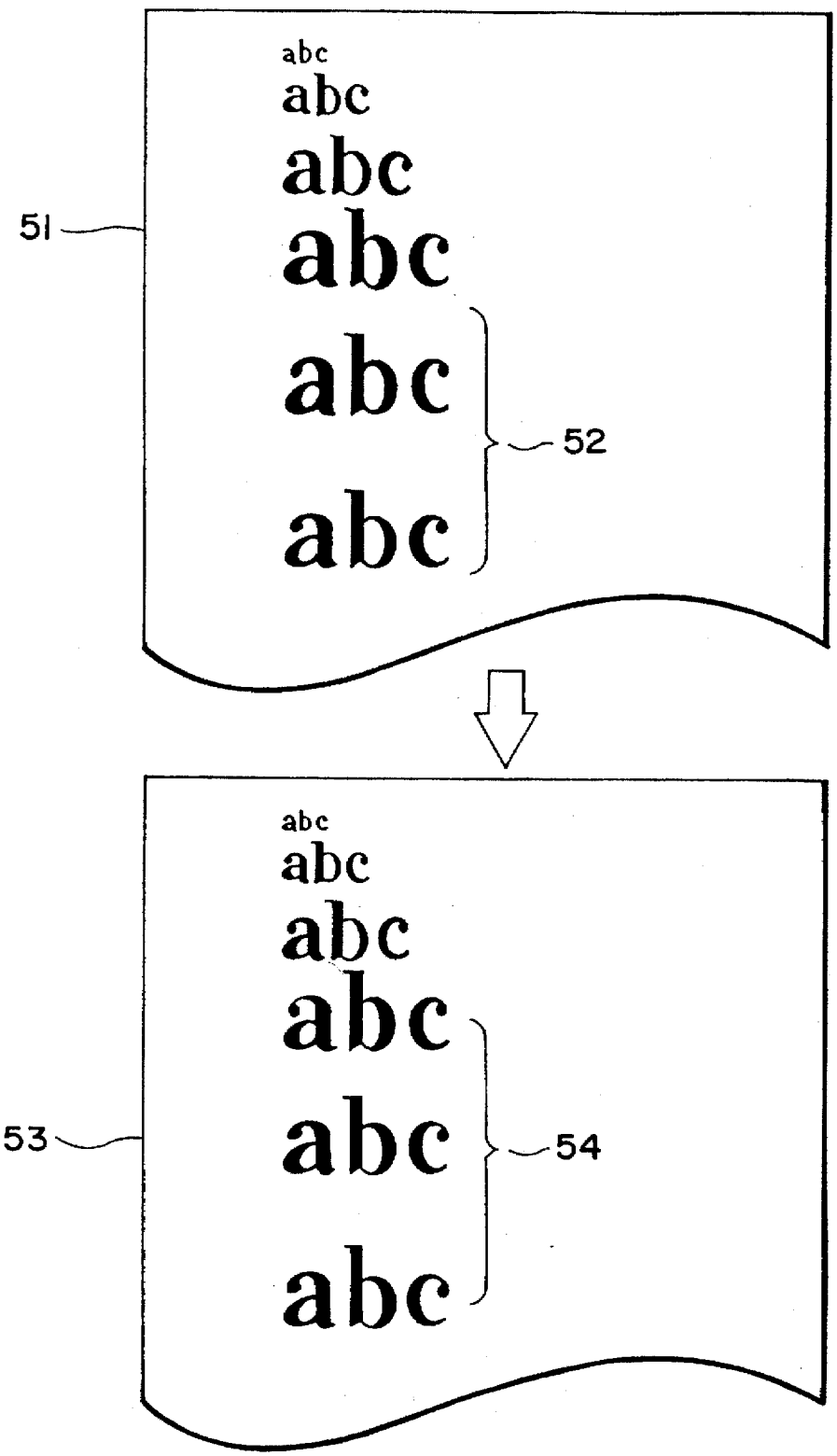
FIG. 11 is a plan view to indicate an example of the conventional character pattern formation process.

In the aforesaid explanations, size of the character pattern has been used as the factor but same explanation can be made also using other factors such as the design or method of formation of character pattern. For example, as shown in FIG. 10, in the case when a character is modified and a shade of void is given thereto, the capacity of memory to be used becomes variable if processing is conducted in such way that the original pattern data are once converted into dot pattern and memorized and then such dot pattern is dot-shifted in another area and after putting it and the original pattern into OR relations, AND is taken with the original pattern.

According to the present embodiment, the most preferred formation of character pattern at a given time which suits the memory composition of the device can be performed without being restricted by the upper limit of the character pattern formation resulted by the basic composition of the device which is not provided with any additional memory and thus character pattern formation as desired by the user is realized.

FIG. 9 shows an example of the procedure for character pattern formation of such example of embodiment.

When printing starts, a data code is transmitted by host computer 1 and the input data is registered by CPU3 unit by unit (Step S1). It judges whether such input data are character data or not. (Step S2). When they are character data, character pattern is formed according to the character pattern format designated at that time (Step S3). The character pattern is printed (Step S4). When the input data are not character data, it judges whether the data are the command to designate the character pattern formation format or not (Step S5). If not, it executes other printing/control processing (Step S6). If it is the command to designate the format, memory environment at that time is discriminated by the memory environment discriminator 13 of the present embodiment (Step S7). Based on such discrimination, the character pattern formation controller 6 of the present embodiment judges whether the designated character pattern formation format is practiceable or not (Step S8).

If it is practiceable, the designated character pattern formation format is memorized so that it may be used in the character pattern formation at a later time. This memorized format is used in the aforesaid (Step S3) process of character pattern formation.

If it is unpracticeable, the character pattern formation format which is practiceable and closest to the designated format is calculated and the format is corrected into such format (Step S10). Thus corrected format is also memorized for later use (Step S9). In other words, in this embodiment, character pattern formation is not hindered by the restriction on the format as it is always so with the conventional device but the optimum character pattern formation at a given time is always realized by judging the memory environment at that time.

Through the aforesaid processing, the operator, at the time of formation and output of the character pattern, is not restricted by the upper limit of character pattern formation resulted by the basic composition of the device not provided with additional memory but can execute the most preferred character pattern formation at a given time matching the memory composition of the device at that time and thus realize the character pattern formation desired by the user.

The present invention may be modified in various ways within the scope not deviating from its basic concept. For example, the present invention may be applied to such case as to form various character patterns which emphasize the profile of the character.

In the aforesaid example of embodiment, the case where the present invention is applied to page printer has been explained but the present invention is not limited thereto but it may be easily applied to other type of printers of such output devices as CRT. For example, when the output device of the present invention is applied to color CRT, it may be so applied as the display of the character etc. is made in monochrome or in multi-colors according to the memory environment.

As explained above, according to the present invention, at the formation and output of the dot font pattern according to the designated format, it is possible to execute the most preferred character pattern formation at a given time matching the memory composition of the device at that time. Therefore the operation is not restricted by the upper limit of character pattern formation resulted by the basic composition of the device not provided with the additional memory but character pattern formation desired by the user can be performed.

We claim:

1. An output apparatus comprising:
    pattern generation means for generating dot matrix pattern data in accordance with non-dot matrix pattern data;
    memory means including a storage area for cacheing the generated dot matrix pattern data;
    discrimination means for discriminating whether said memory means has been given an additional storage area; and
    control means for variably setting a size of the cacheing storage area in said memory means in response to a discrimination made by said discrimination means,
    wherein said control means determines whether a pattern to be output is stored in said memory means and reads the pattern from said memory means if the pattern is stored in said memory means and controls generating of the pattern if the pattern is not stored in said memory means.

2. An apparatus according to claim 1, wherein the non-dot matrix pattern data comprises dot matrix font data compressed in a run length method.

3. An apparatus according to claim 1, wherein the non-dot matrix pattern data comprises vector font data.

4. An apparatus according to claim 1, further comprising means for outputting the dot matrix pattern data generated by said pattern generation means.

5. An apparatus according to claim 4, wherein said output means comprises a laser beam printer.

6. An apparatus according to claim 1, wherein said memory means comprises a random access memory provided in said apparatus.

7. An apparatus according to claim 1, wherein said memory means comprises a random access memory provided in said apparatus and another random access memory detachably connected to said apparatus.

8. An apparatus according to claim 7, wherein said another random access memory comprises an extended RAM board.

9. An apparatus according to claim 7, wherein said another random access memory comprises a RAM cartridge.

10. An apparatus according to claim 1, wherein said control means variably sets the size of the cacheing storage area in accordance with a capacity of said memory means.

11. An apparatus according to claim 1, further comprising means for connecting an external storage device to said apparatus and means for detecting that the external storage device has been connected to said apparatus by said connecting means, wherein said control means variably sets the size of the cacheing storage area in response to a detection by said detection means.

12. An apparatus according to claim 1, wherein the dot matrix pattern data stored in the cacheing storage area is deleted in a FIFO system.

13. An apparatus according to claim 1, wherein the instruction is given by the operator via a host computer.

14. An apparatus according to claim 1, wherein said control means variably sets the size of the cacheing storage area depending on whether a memory is provided for giving the additional storage area.

15. A method of outputting data from an apparatus, said method comprising the steps of generating dot matrix pattern data in accordance with non-dot matrix pattern data;

cacheing the generated dot matrix pattern data in a storage area of a memory;

discriminating whether said the memory has been given an additional storage area; and controlling the memory to variably set a size of the cacheing storage area in the memory in response to a discrimination made in said discriminating step, wherein said controlling step determines whether a pattern to be output is stored in the memory and reads the pattern from the memory if the pattern is stored in the memory and controls generating of the pattern if the pattern is not stored in the memory.

16. A method according to claim 15, wherein the non-dot matrix pattern data comprises dot matrix font data compressed in a run length method.

17. A method according to claim 15, wherein the non-dot matrix pattern data comprises vector font data.

18. A method according to claim 15, further comprising a step for outputting the dot matrix pattern data generated.

19. A method according to claim 18, wherein the step of outputting comprises outputting using a laser beam printer.

20. A method according to claim 15, wherein the memory comprises a random access memory provided in the apparatus.

21. A method according to claim 15, wherein the memory comprises a random access memory provided in the apparatus and another random access memory detachably connected to the apparatus.

22. A method according to claim 21, wherein the another random access memory comprises an extended RAM board.

23. A method according to claim 21, wherein the another random access memory comprises a RAM cartridge.

24. A method according to claim 15, wherein said control step variably sets the size of the cacheing storage area in accordance with a capacity of the memory.

25. A method according to claim 15, further comprising a step for connecting an external storage device to the apparatus and for detecting that the external storage device has been connected to the apparatus, wherein said control step variably sets the size of the cacheing storage area in response to a detection by said detection step.

26. A method according to claim 15, wherein the dot matrix pattern data stored in the cacheing storage area is deleted in a FIFO system.

27. A method according to claim 15, wherein the instruction is given by the operator via a host computer.

28. A method according to claim 15, wherein said control step includes variably setting the size of the cacheing storage area depending on whether a memory is provided for giving the additional storage area.

* * * * *

UNITED STATES PATENT AND TRADEMARK OFFICE
CERTIFICATE OF CORRECTION

PATENT NO. : 5,696,984

DATED : December 9, 1997

INVENTOR(S): SATOSHI NAGATA ET AL.                    Page 1 of 4

It is certified that error appears in the above-identified patent and that said Letters Patent is hereby corrected as shown below:

<u>ON TITLE PAGE, AT [63] RELATED U.S. APPLICATION DATA</u>

"Continuation-in-part" should read --Continuation--.

<u>COLUMN 1</u>

Line 18, "outputs" should read --output--;
Line 39, "memories" should read --memorizes the--.

<u>COLUMN 2</u>

Line 36, "The typical" should read --Typical--.

<u>COLUMN 3</u>

Line 15, "therefore." should read --therefor.--;
Line 17, "defficiency" should read --deficiency--.

<u>COLUMN 4</u>

Line 61, "drawing." should read --drawings.--.

<u>COLUMN 5</u>

Line 21, "polyhydral" should read --polyhedral--.

UNITED STATES PATENT AND TRADEMARK OFFICE
CERTIFICATE OF CORRECTION

PATENT NO. : 5,696,894

DATED : December 9, 1997

INVENTOR(S): SATOSHI NAGATA ET AL.

It is certified that error appears in the above-identified patent and that said Letters Patent is hereby corrected as shown below:

COLUMN 6

```
Line  1, "one" should read --a one--;
Line  8, "print 111;" should read --;--;
Line 10, "signal;" should read --signals;--
Line 17, ""●" part" should read --"_" part--;
Line 22, "128 byte" should read --128 bytes--;
Line 56, "[8 bit" should read --[8 bits--;
Line 59, "bit" should read --bits-- (both occurrences);
Line 60, "bit" should read --bits-- (both occurrences).
```

COLUMN 7

```
Line 11, "memory 209" should read --memory 207--;
Line 37, "memory 209" should read --memory 207--;
Line 38, "memory 209" should read --memory 207--;
Line 45, "memory 202" should read --memory 203--.
```

COLUMN 8

```
Line 24, "memory 209" should read --memory 207;
Line 26, "is" should read --are--;
Line 43, "embodiment," should read --the embodiment,--.
```

UNITED STATES PATENT AND TRADEMARK OFFICE
CERTIFICATE OF CORRECTION

PATENT NO. : 5,696,894

DATED : December 9, 1997

INVENTOR(S): SATOSHI NAGATA ET AL.

It is certified that error appears in the above-identified patent and that said Letters Patent is hereby corrected as shown below:

COLUMN 9

Line 28, "is" should read --in--;
Line 35, "said" should be deleted;
Line 38, "said" should be deleted;
Line 39, "font" should read --the font--;
Line 61, "program a" should read --program,--.

COLUMN 37

Line 37, "character" (first occurrence) should read --a character--.

COLUMN 11

Line 11, "embodiment," should read --the embodiment,--

UNITED STATES PATENT AND TRADEMARK OFFICE
CERTIFICATE OF CORRECTION

PATENT NO. : 5,696,894

DATED : December 9, 1997

INVENTOR(S): SATOSHI NAGATA ET AL.

It is certified that error appears in the above-identified patent and that said Letters Patent is hereby corrected as shown below:

<u>COLUMN 13</u>

```
Line 23, "of" should read --of:--;
Line 28, "said the" should read --said--.
```

Signed and Sealed this

Twenty-first Day of July, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,696,984

DATED : December 9, 1997

INVENTOR(S): SATOSHI NAGATA ET AL.

It is certified that error appears in the above-identified patent and that said Letters Patent is hereby corrected as shown below:

ON TITLE PAGE, AT [63] RELATED U.S. APPLICATION DATA

"Continuation-in-part" should read --Continuation--.

COLUMN 1

Line 18, "outputs" should read --output--;
Line 39, "memories" should read --memorizes the--.

COLUMN 2

Line 36, "The typical" should read --Typical--.

COLUMN 3

Line 15, "therefore." should read --therefor.--;
Line 17, "defficiency" should read --deficiency--.

COLUMN 4

Line 61, "drawing." should read --drawings.--.

COLUMN 5

Line 21, "polyhydral" should read --polyhedral--.

UNITED STATES PATENT AND TRADEMARK OFFICE
CERTIFICATE OF CORRECTION

PATENT NO. : 5,696,984

DATED : December 9, 1997

INVENTOR(S): SATOSHI NAGATA ET AL.

It is certified that error appears in the above-identified patent and that said Letters Patent is hereby corrected as shown below:

COLUMN 6

```
Line 1,  "one" should read --a one--;
Line 8,  "print 111;" should read --;--;
Line 10, "signal;" should read --signals;--
Line 17, ""●" part" should read --"_" part--;
Line 22, "128 byte" should read --128 bytes--;
Line 56, "[8 bit" should read --[8 bits--;
Line 59, "bit" should read --bits-- (both occurrences);
Line 60, "bit" should read --bits-- (both occurrences).
```

COLUMN 7

```
Line 11, "memory 209" should read --memory 207--;
Line 37, "memory 209" should read --memory 207--;
Line 38, "memory 209" should read --memory 207--;
Line 45, "memory 202" should read --memory 203--.
```

COLUMN 8

```
Line 24, "memory 209" should read --memory 207;
Line 26, "is" should read --are--;
Line 43, "embodiment," should read --the embodiment,--.
```

UNITED STATES PATENT AND TRADEMARK OFFICE
CERTIFICATE OF CORRECTION

PATENT NO. : 5,696,984

DATED : December 9, 1997

INVENTOR(S): SATOSHI NAGATA ET AL.

It is certified that error appears in the above-identified patent and that said Letters Patent is hereby corrected as shown below:

COLUMN 9

Line 28, "is" should read --in--;
Line 35, "said" should be deleted;
Line 38, "said" should be deleted;
Line 39, "font" should read --the font--;
Line 61, "program a" should read --program,--.

COLUMN 37

Line 37, "character" (first occurrence) should read
  --a character--.

COLUMN 11

Line 11, "embodiment," should read --the embodiment,--

UNITED STATES PATENT AND TRADEMARK OFFICE
CERTIFICATE OF CORRECTION

PATENT NO. :   5,696,984

DATED      :   December 9, 1997

INVENTOR(S):   SATOSHI NAGATA ET AL.

It is certified that error appears in the above-identified patent and that said Letters Patent is hereby corrected as shown below:

<u>COLUMN 13</u>

Line 23, "of" should read --of:--;
Line 28, "said the" should read --said--.

Signed and Sealed this

Eighteenth Day of August, 1998

Attest:

BRUCE LEHMAN

Attesting Officer

Commissioner of Patents and Trademarks